United States Patent
Tsai

(10) Patent No.: US 8,471,831 B2
(45) Date of Patent: Jun. 25, 2013

(54) TOUCH PANEL WITH CARBON NANOTUBE FILM

(75) Inventor: Tai-Sheng Tsai, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 579 days.

(21) Appl. No.: 12/764,970

(22) Filed: Apr. 22, 2010

(65) Prior Publication Data

US 2011/0148815 A1 Jun. 23, 2011

(30) Foreign Application Priority Data

Dec. 18, 2009 (CN) .......................... 2009 1 0311863

(51) Int. Cl.
*G06F 3/042* (2006.01)

(52) U.S. Cl.
USPC ....................................... 345/175; 178/18.09

(58) Field of Classification Search
USPC .................. 345/173–179; 178/18.01, 18.03, 178/18.09
See application file for complete search history.

(56) References Cited

U.S. PATENT DOCUMENTS

| | | | | |
|---|---|---|---|---|
| 6,303,094 | B1 * | 10/2001 | Kusunoki et al. | 423/447.1 |
| 7,535,462 | B2 * | 5/2009 | Spath et al. | 345/174 |
| 7,645,497 | B2 * | 1/2010 | Spath et al. | 428/1.4 |
| 8,111,245 | B2 * | 2/2012 | Jiang et al. | 345/173 |
| 8,146,861 | B2 * | 4/2012 | Lengsfeld et al. | 244/121 |
| 8,212,792 | B2 * | 7/2012 | Kent | 345/174 |
| 8,237,677 | B2 * | 8/2012 | Jiang et al. | 345/173 |
| 8,269,746 | B2 * | 9/2012 | Hodges et al. | 345/175 |
| 2011/0007012 | A1 * | 1/2011 | Shih | 345/173 |

* cited by examiner

*Primary Examiner* — Regina Liang
(74) *Attorney, Agent, or Firm* — Altis Law Group, Inc.

(57) ABSTRACT

An exemplary touch panel, includes a flexible first substrate, a second substrate opposite to the first substrate, a first electrically conductive layer formed on the first substrate and facing the second substrate, a second electrically conductive layer formed on the second substrate and facing the first substrate, a carbon nanotube film formed on the second electrically conductive layer, a plurality of insulated dot spacers arranged between the first electrically conductive layer and the carbon nanotube film, an infrared sensor array arranged on the second substrate and including a number of infrared sensors corresponding to pixels of the touch panel; and a signal processor receiving signals from the infrared sensors.

6 Claims, 2 Drawing Sheets

TOUCH PANEL WITH CARBON NANOTUBE FILM

BACKGROUND

1. Technical Field

The present disclosure relates to touch panels, and particularly to a touch panel having a carbon nanotube film formed therein.

2. Description of Related Art

Many touch panels use a number of light sources and image sensors on edges of the panel. When the panel is pressed, light from one or more of the light sources is blocked at the pressed position, and the image sensors obtain the pressed position.

However, as the light sources and the image sensors are mounted on the surface of the touch panel facing the users, the light sources and the image sensors make the entire touch panel thicker as well as being poorly protected.

What is needed, therefore, is a touch panel which can overcome the above shortcomings.

BRIEF DESCRIPTION OF THE DRAWINGS

Many aspects of the present touch panel can be better understood with reference to the following drawings. The components in the drawings are not necessarily drawn to scale, the emphasis instead being placed upon clearly illustrating the principles of the present touch panel. Moreover, in the drawings, like reference numerals designate corresponding parts throughout the several views.

DETAILED DESCRIPTION OF THE EMBODIMENTS

Embodiments of the present touch panel will now be described in detail below and with reference to the drawings.

Figure 1:
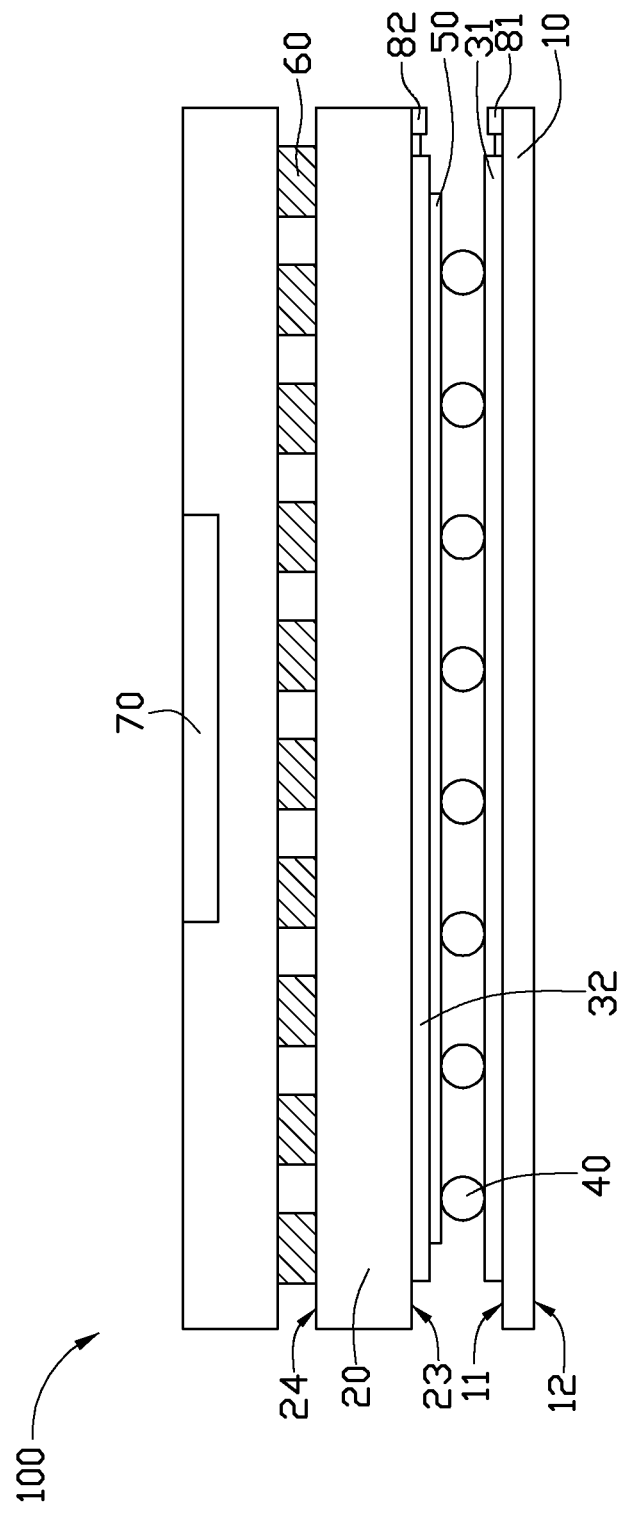
FIG. 1 is a schematic view of a touch panel in accordance with a first embodiment.

Referring to FIG. 1, a touch panel 100 in accordance with a first embodiment, is provided. The touch panel 100 includes a first substrate 10, a second substrate 20, a first electrically conductive layer 31, a second electrically conductive layer 32, a number of insulated dot spacers 40, a carbon nanotube film 50, an infrared sensor array 60 and a signal processor 70.

The first substrate 10 is opposite to the second substrate 20, with a gap is maintained between the first substrate 10 and the second substrate 20. The first substrate 10 includes a first surface 11 facing the second substrate 20, and an opposite second surface 12 facing users. The second substrate 20 includes a third surface 23 facing the first substrate 10 and an opposite fourth surface 24. The first substrate 10 is flexible. The first substrate 10 and the second substrate 20 may be made of silicon dioxide.

The first electrically conductive layer 31 is formed on the first surface 11 of the first substrate 10, and the second electrically conductive layer 32 is formed on the third surface 23 of the second substrate 20. The first and second electrically conductive layers 31, 32 may be made of indium tin oxide (ITO), and thus be transparent. The first and second electrically conductive layers 31, 32 may be formed on the first and second substrates 10, 20 by a deposition method. The first electrically conductive layer 31 is electrically connected to a first electrode 81, and the second electrically conductive layer 32 is electrically connected to a second electrode 82.

The carbon nanotube film 50 is formed on the second electrically conductive layer 32 and faces the first electrically conductive layer 31. The carbon nanotube film comprises carbon nanotubes parallel with each other, with central axes of the carbon nanotubes aligned along a thicknesswise direction of the entire film. The carbon nanotubes may be carbon nanotube segments divided from a carbon nanotube array. The carbon nanotube film 50 is thin and transparent. The carbon nanotubes have excellent electrical and thermal conductivity along the central axes thereof, thus the carbon nanotube film 50 is capable of immediately generating heat when an electrical current is passed through it, and then the carbon nanotube film 50 produces infrared light.

The insulated dot spacers 40 are arranged between the carbon nanotube film 50 and the first electrically conductive layer 31. The insulated dot spacers 40 are spaced apart from each other, and are configured for spacing the carbon nanotube film 50 from the first electrically conductive layer 31. With this configuration, when nothing presses the second surface 12 of the first substrate 10, the first electrically conductive layer 31 will not contact the carbon nanotube film 50, thus a circuit will not form between the first and second electrodes 81, 82, and the carbon nanotube film 50 is not electrically connected.

The infrared sensor array 60 is located on the fourth surface 24 of the second substrate 20. The infrared sensor array 60 includes a number of infrared sensors arranged to spatially corresponding to pixels of the touch panel, i.e., pixels of a display screen of an electronic device employing the touch panel. In particular, when the touch panel is directly applied on a display screen of an electronic device, the first and second substrates 10, 20, the first and second electrically conductive layers 31, 32, and the carbon nanotube film 50 need to be transparent.

The signal processor 70 receives signals from the infrared sensor array 60. In application, when a pressure is applied, such as that which is imparted by a fingertip or stylus, on the second surface 12 of the first substrate 10, the first electrically conductive layer 31 electrically contacts the carbon nanotube film 50, and a circuit is thus formed between the first and second electrodes 81, 82. In this way, the carbon nanotube film 50 is electrically connected. The carbon nanotube film 50 generates heat and produces infrared light, then, the infrared sensors receive the infrared light and give signals to the signal processor 70. In particular, the carbon nanotubes of the carbon nanotube film 50 which correspond to the pressed position will immediately generate heat and produce infrared light of an intensity greater than any neighboring portions of the film, and then the corresponding infrared sensor will send a signal to the signal processor 70 having more power than any other signals concurrently being sent by remaining sensors, thus the signal processor 70 can obtain the pressed position based on the signal.

Figure 2:
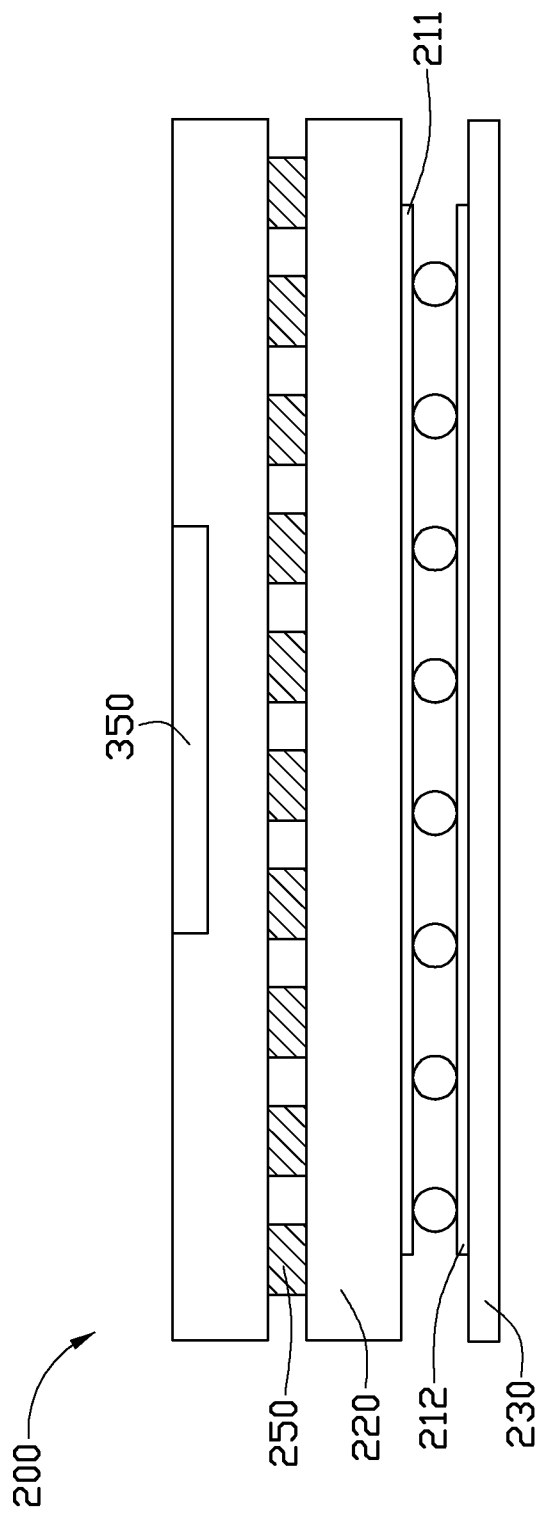
FIG. 2 is a schematic view of a touch panel in accordance with a second embodiment.

Referring to FIG. 2, a touch panel 200 in accordance with a second embodiment is provided. The touch panel 200 is essentially similar to the touch panel 100 as illustrated above, except that a first carbon nanotube film 211 and a second carbon nanotube film 212 are directly formed on a first substrate 230 and a second substrate 220, respectively. The carbon nanotubes of the first and second carbon nanotube films 211, 212 are parallel with each other with central axes thereof aligned along height directions of the films. The carbon nanotubes have excellent electrical and thermal conductivity along the central axes thereof, such that a circuit is easily formed between the first and second carbon nanotube films 211, 212 when they are pressed into contact with each other. The first and second carbon nanotube films 211, 212 can be configured as a first electrically conductive layer and a second electrically conductive layer of the touch panel 200.

The first and second carbon nanotube films 211, 212 will generate heat and produce infrared light when an electrical current is passed therethrough, and the carbon nanotubes corresponding to the pressed position will immediately generate heat and produce infrared light of an intensity greater than any neighboring portions of the films, and then the corresponding infrared sensor will send a signal to the signal processor 350 having more power than any other signals concurrently being sent by remaining sensors, and then the signal processor 350 can obtain the press position based on the highest signal from the corresponding infrared sensor 250.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A touch panel, comprising:
    a flexible first substrate comprising a first surface and an opposite second surface;
    a second substrate opposite to the first substrate, the second substrate comprising a third surface facing the first surface of the first substrate, and an opposite fourth surface;
    a first electrically conductive layer formed on the first surface of the first substrate;
    a second electrically conductive layer formed on the third surface of the second substrate;
    a carbon nanotube film formed on the second electrically conductive layer, wherein the carbon nanotube film comprises a plurality of carbon nanotubes substantially parallel with each other, with central axes of the carbon nanotubes along a thicknesswise direction of the carbon nanotube film;
    a plurality of insulated dot spacers arranged between the first electrically conductive layer and the carbon nanotube film;
    an infrared sensor array arranged on the fourth surface of the second substrate, the infrared sensor array comprising a plurality of infrared sensors spatially corresponding to pixels of the touch panel; and
    a signal processor configured for receiving signals from the infrared sensors, wherein the first electrically conductive layer is configured for electrically contacting the carbon nanotube film, when a press is applied to the second surface of the first substrate, whereby some of the carbon nanotubes which correspond to a touch position of the press generate heat and produce infrared light of an intensity greater than any neighboring carbon nanotubes, the infrared sensors are configured for sensing the infrared light and sending signals to the signal processor, and the signal processor is configured for determining the touch position of the press on the second surface of the first substrate based on the signals.

2. The apparatus of claim 1, wherein the first and second substrates, the first and second electrically conductive layers and the carbon nanotube films are transparent.

3. The apparatus of claim 1, further comprising a first electrode electrically connected to the first electrically conductive layer and a second electrode electrically connected to the second electrically conductive layer.

4. A touch panel, comprising:
    a flexible first substrate comprising a first surface and an opposite second surface;
    a second substrate opposite to the first substrate, the second substrate comprising a third surface facing the first surface of the first substrate, and an opposite fourth surface;
    a first carbon nanotube film formed on the first surface of the first substrate;
    a second carbon nanotube film formed on the third surface of the second substrate, wherein each of the first and second carbon nanotube films comprises carbon nanotubes substantially parallel with each other, with central axes of the carbon nanotubes along a thicknesswise direction of both the first and second carbon nanotube films;
    a plurality of insulated dot-shaped spacers arranged between the first and second carbon nanotube films;
    an infrared sensor array arranged on the fourth surface of the second substrate, the infrared sensor array comprising a plurality of infrared sensors spatially corresponding to pixels of the touch panel; and
    a signal processor configured for receiving signals from the infrared sensors, wherein the first carbon nanotube film is configured for electrically contacting the second carbon nanotube film, when a portion of the second surface of the first substrate applied is touched, whereby some of the carbon nanotubes of the second carbon nanotube film which correspond to a position of the pressed portion generate heat and produce infrared light of an intensity greater than any neighboring carbon nanotubes of the second carbon nanotube film, the infrared sensors are configured for sensing the infrared light and sending signals to the signal processor, and the signal processor is configured for determining the position of the pressed portion based on the signals.

5. The apparatus of claim 4, wherein the first and second substrates, and the first and second carbon nanotube films are transparent.

6. The apparatus of claim 4, further comprising a first electrode electrically connected to the first carbon nanotube film and a second electrode electrically connected to the second carbon nanotube film.

* * * * *